United States Patent [19]

Middleton

[11] Patent Number: 4,597,203

[45] Date of Patent: Jul. 1, 1986

[54] CONVERTIBLE SNOWBLOWER USING RECTANGULAR SHROUD INTERFACE

[76] Inventor: Carlisle A. Middleton, 38 Dungarrie Rd., Baltimore, Md. 21228

[21] Appl. No.: 764,712

[22] Filed: Aug. 12, 1985

[51] Int. Cl.⁴ .............................................. E01H 5/00
[52] U.S. Cl. ....................................... 37/241; 37/242; 37/243; 37/248; 56/2; 56/16.4; 56/5; 56/DIG. 9; 15/4; 15/328; 15/339; 15/412; 239/663; 239/274; 239/289; 172/247
[58] Field of Search .................................. 37/241–243, 37/248; 56/2, 5, 16.4, DIG. 9; 15/4, 328, 339, 412; 239/663, 274, 289; 172/247, 42

[56] References Cited

U.S. PATENT DOCUMENTS

| | | |
|---|---|---|
| 2,675,660 | 4/1954 | Barnard . |
| 2,770,894 | 11/1956 | Gettleman . |
| 2,827,714 | 3/1958 | Hyde ..................... 37/242 |
| 2,888,084 | 5/1959 | Trecker . |
| 2,930,068 | 3/1960 | Evanson et al. . |
| 3,131,491 | 5/1964 | Durrschmidt . |
| 3,319,363 | 5/1967 | Kennedy ................. 37/243 |
| 3,334,429 | 8/1967 | Price ..................... 37/243 |
| 3,373,514 | 3/1968 | Forren . |
| 3,695,716 | 10/1972 | Meyer .................... 37/241 |
| 3,774,321 | 11/1973 | David . |
| 3,978,929 | 9/1976 | Clark .................... 172/42 |
| 3,995,348 | 12/1976 | Chernosky ............... 37/243 |
| 3,999,316 | 12/1976 | Palmer . |
| 4,064,679 | 12/1977 | Spinner . |
| 4,278,133 | 7/1981 | Marcellus ............... 172/42 |
| 4,308,676 | 1/1982 | Doane .................... 56/16.9 |
| 4,446,679 | 5/1984 | Thomas ................... 56/16.9 |

Primary Examiner—E. H. Eickholt
Attorney, Agent, or Firm—John F. McClellan, Sr.

[57] ABSTRACT

A basic snowblower unit powered by an engine has a rectangular shroud housing a fan with a drive member associated with it. A considerable number of special units including lawnmower, vacuum-and-bagger, leaf picker, edger, rotary tiller, leaf blower, sprayer, electric generator, hydraulic pump, and air compressor, are individually attachable for support and powering by the basic snowblower unit, providing for all-year use of it, compact storage and economy in purchase and ownership.

23 Claims, 18 Drawing Figures

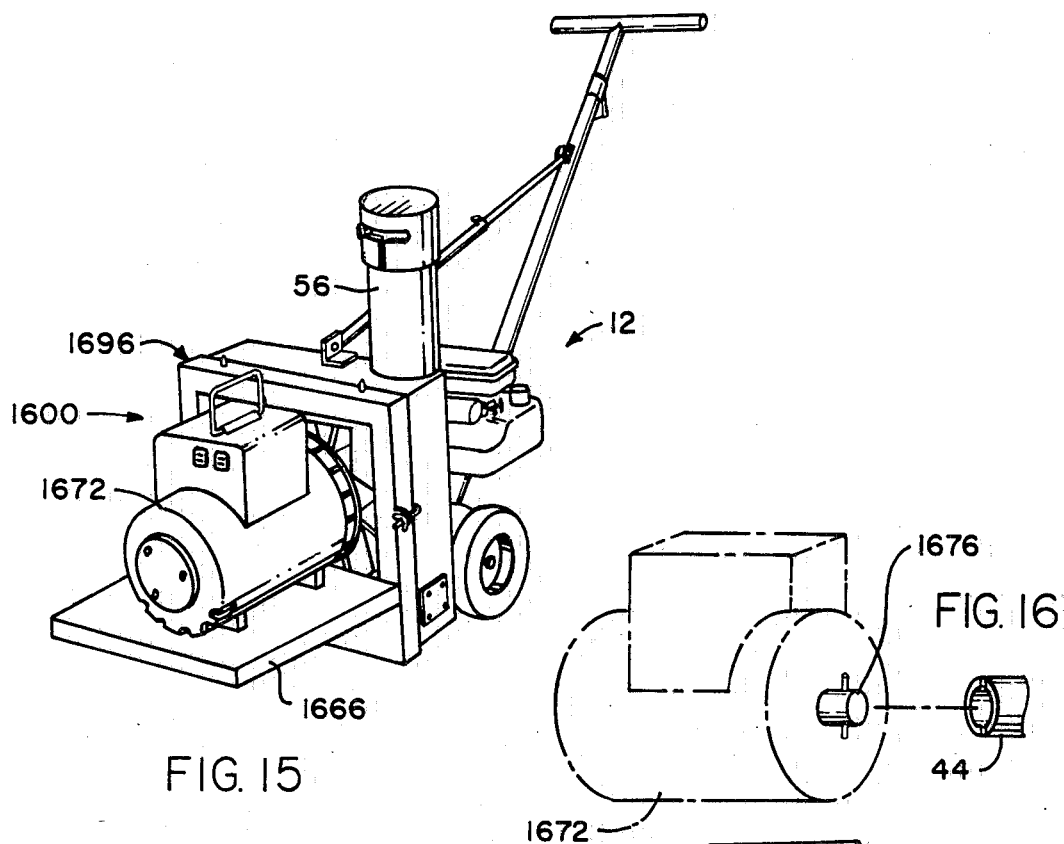
FIG. 15
FIG. 16
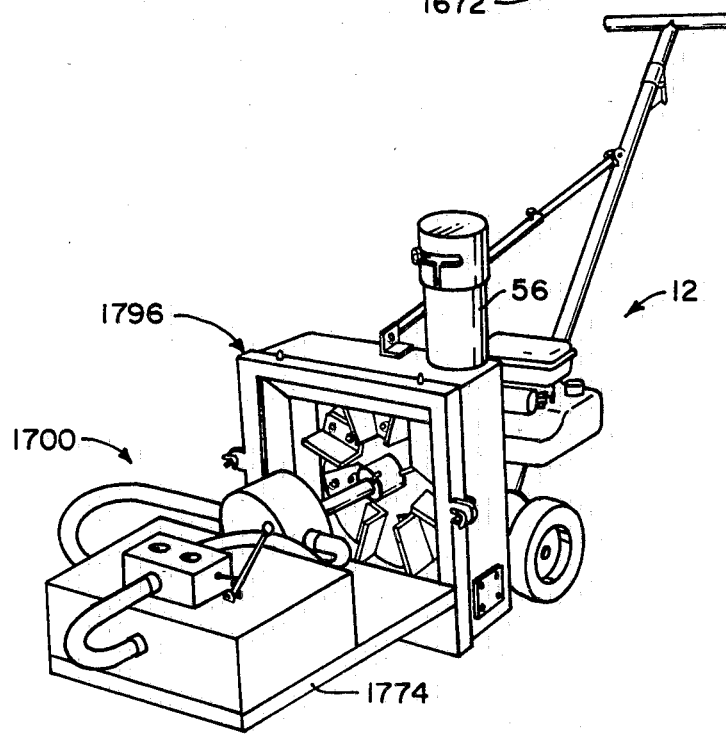
FIG. 17

CONVERTIBLE SNOWBLOWER USING RECTANGULAR SHROUD INTERFACE

FIELD OF THE INVENTION

This invention relates generally to land vehicles and particularly to powered wheeled vehicles equipped to do a variety of tasks.

BACKGROUND OF THE INVENTION

Combined-function equipment and various lawn and garden equipment have been disclosed in various U.S. patents:

U.S. Pat. No. 2,675,660 to W. S. Barnard, 4-20-54, showed a tilting bedplate machines usable, with attachments, as a mower or as a snow blower or as a lawn cleaner;

U.S. Pat. No. 2,770,894 to R. O. Gettleman, 11-20-56, showed a self-propelled snow remover/lawn mower system;

U.S. Pat. No. 2,930,068 to A. E. Evanson and M. A. Hickey, 3-29-60, showed a lawn mower vacuum device;

U.S. Pat. No. 3,131,491 to R. G. Durrschmidt, 5-5-64, showed an upright snow blower attachment for the front of a rotary mower, powered from a hub on the rotary mower shaft (72,FIG. 1);

U.S. Pat. No. 3,373,514 to R. E. Forren, 3-19-68, showed a combination rotary lawn mower and snow blower;

U.S. Pat. No. 3,774,321 to L. E. David, 11-27-73, showed a horizontal transverse snow blower for a rotary mower;

U.S. Pat. No. 3,999,316 to R. E. Palmer, 12-28-76, showed conversion of snow blower to lawn sweeper for summer use;

U.S. Pat. No. 4,064,679 to D. Spinner, 12-27-77, showed a convertible combination snow blower, lawn mower and lawn sweeper.

However, no system is known that provides an improved gasoline engine powered snowblower with a variety of similarly attachable conversion units powered by it and adapting it for additional uses as a lawnmower with, if desired, a vacuum leaf bagger of novel design, an electric generator, a hydraulic pump, a leaf picker, an edger, a rotor tiller, a leaf blower, a sprayer, and an air compressor, and to provide such are principal objects of this invention.

Further objects are to provide a system as described that economically puts the snowblower basic unit to work in all seasons and avoids need for any auxiliary power to operate the combinational units.

Yet further objects are to provide a system as described that is relatively free of vibration in operation, that is economical and durable, that requires little room for storage, that is easy to connect and disconnect, that is easy and convenient to use, and that provides not only power but also cooling airflow when desired, to units with which the basic snowblower unit is combined.

The above and other objects and advantages of this invention will become more readily apparent on examination of the following description, including the drawings in which like reference numerals refer to like parts.

FIG. 15 is a front perspective view of an electric generator unit in combination with the snowblower basic unit;

FIG. 16 is an exploded view of a drive detail thereof;

FIG. 17 is a front perspective view of a hydraulic pump unit in combination with the basic snowblower unit.

DETAILED DESCRIPTION

Figure 1:
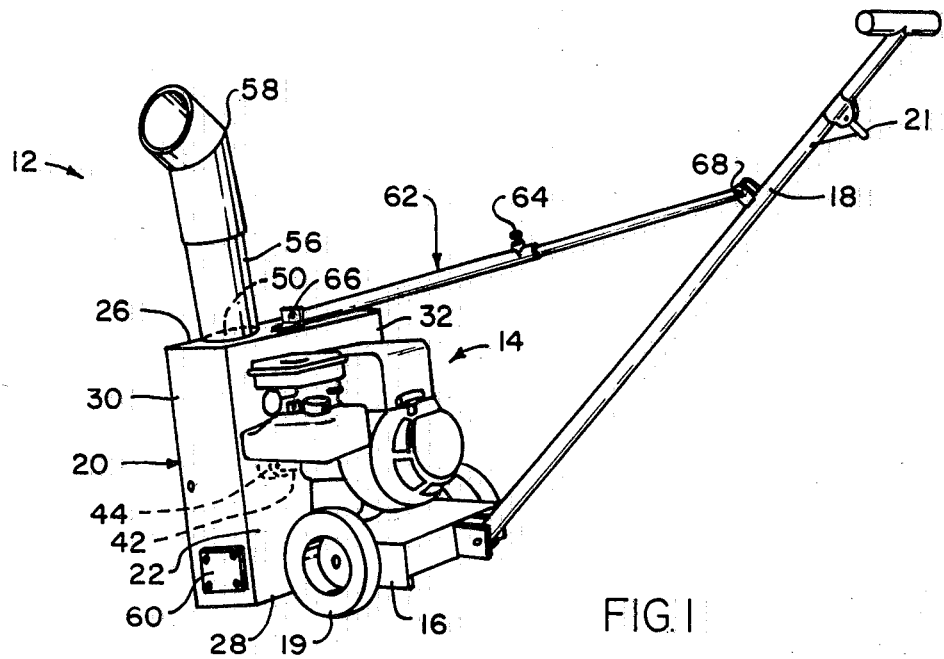
FIG. 1 is a rear perspective view of a snowblower basic unit according to this invention.
Figure 2:
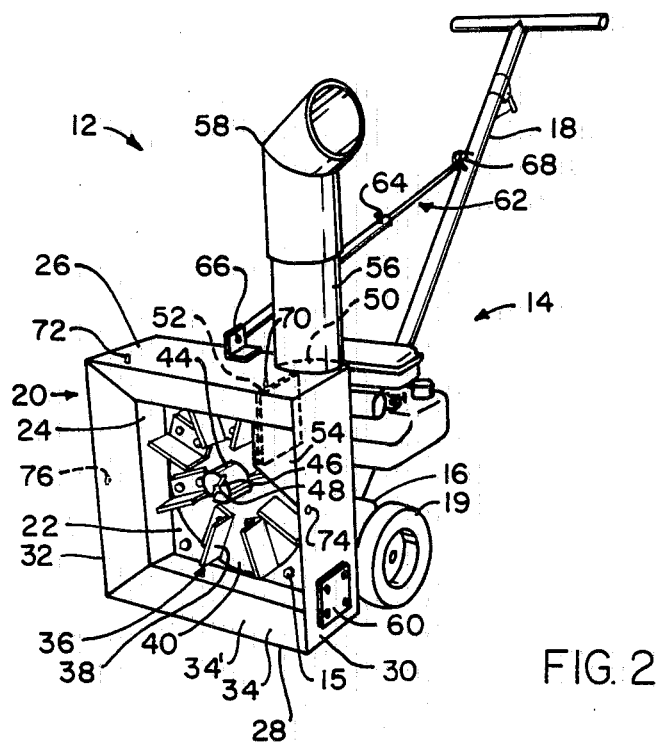
FIG. 2 is a front perspective view thereof.

FIGS. 1 and 2 show the basic snowblower unit 12 that combines with and powers means for performing additional functions useful in lawn, horticultural, maintenance and other applications, both domestic and commercial.

The basic snowblower unit 12 has a conventional internal combustion engine 14 or other suitable power source mounted on a chassis 16 and having a rearwardly extending handle 18. Preferably, this unit has also a conventional drive for rotating the paired ground engaging wheels 19 under suitable control as at 21.

As a permanent part of the basic snowblower unit 12, a most effective and versatile ducted fan assembly is bolted as at 15 or otherwise conventionally affixed to the forward end of the chassis 16.

It includes a rectangular shroud 20 with closed rear face 22, open forward face 24, and hollow (for lightness) top 26, bottom 28, and left 30 and right 32 sides. The forward portion of the top, bottom and sides 34 inclines thicker rearwardly from a relatively sharp front edge for scooping snow, as at 34'.

A fan 36 or blower element is in the shroud. Preferably the fan 36 comprises a radial array of lengths of angle 38 bolted or welded to a back plate 40 fixed adjacent the end of a horizontal output-shaft 42 from the engine 14 that extends forwardly into the shroud 20. Plate 40 is circular.

The end of the shaft 42 carries coaxial with it a first drive member 44 that couples with some of the means for performing functions in addition to snow blowing, as will be described later. Preferably the first drive member is a cylindrical relatively thick-wall tube with a diametrical slot 46 passing through the bore 48. Rotation is clockwise as judged from the rear. Snow, or other material desired to be removed, is drawn in the front by the fan 36 and ejected upwardly through an opening 50 at the left side of the top, aided by action of a stripper plate 52. The stripper plate forms the inner-side wall of an open-bottom and open-top duct 54 extending from about the level of the shaft 42 upward to the hole 50. A short stack 56 is fixed at the hole, as by welding, to conduct away material blown through it, and telescoped on the upper part of the short stack 56 a rotatable bent or deflector stack 58 is fitted. A detachable plate 60 covers an opening through the lower end of the left side of the shroud 20.

Preferably, a telescoping brace 62 with length-adjustment screw 64 at the overlap, extends from a pivotal connection 66 to the top of the shroud to pivotal connection 68 on the handle, for easy and secure handle-angle adjustment.

It will be appreciated that the snowblower basic unit 12 described is efficient, is easy and simple to make, is lightweight but rigid, strong and durable, can be made of steel, aluminum, or of suitable thermoplastic in large part, and is attractive in appearance.

Importantly, it is compact, so that it takes little room, and accepts attachment of other units to it, for powering by it, without complexity, need for difficult adjustments, or forming an unduly bulky assembly. For attachment of other units the shroud top 26 has small upwardly projecting round-end studs, preferably two at 70, 72 spaced toward the sides of the top, near the front edge, and the shroud has midway of each side 30, 32 near the front edge, a small hole 74, 76 through the outer plate of the side. Wheels 19 hold the shroud near the ground.

Figure 3:
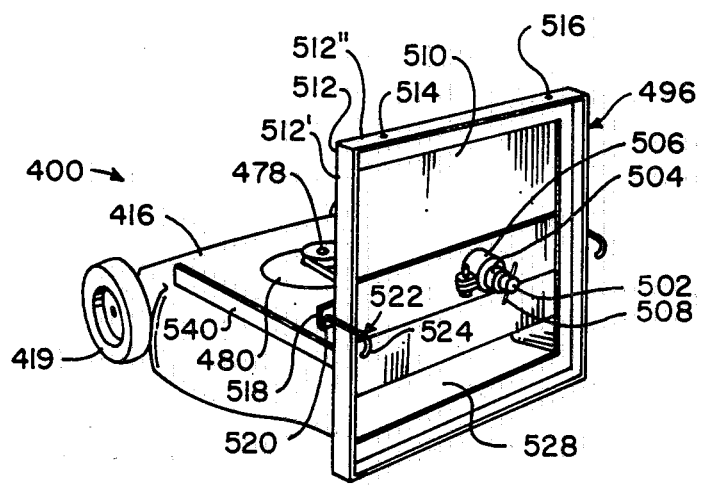
FIG. 3 is a rear perspective view of a lawnmower unit for combination with the snowblower basic unit.
Figure 4:
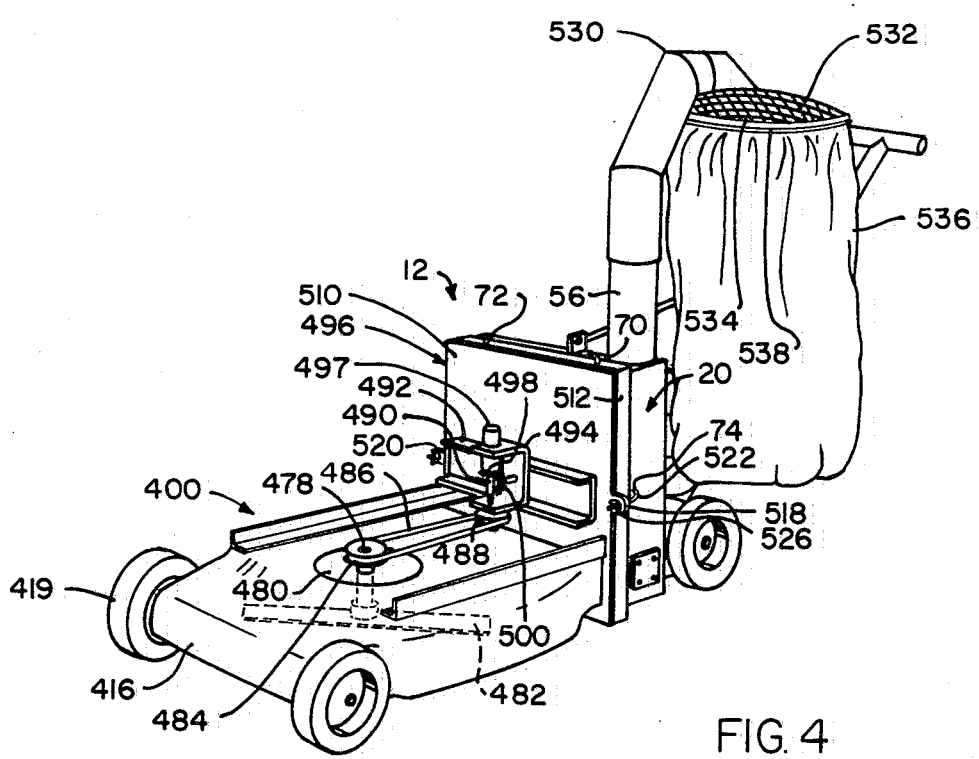
FIG. 4 is a front perspective view of the combination of lawnmower unit and snowblower basic unit.

FIGS. 3 and 4 show a unit 400 for performing additional functions and how it and the basic snowblower unit 12 are assembled, typifying assembly of other such units provided according to this invention.

Unit 400 is a rotary lawnmower unit complementary to the basic snowblower unit 12. The lawnmower portion has paired wheels 419, forward, attached to a conventional housing 416 having a centrally located vertical shaft 478 in a bearing plate 480 and terminating below in a conventional rotary mower blade 482. A stepped vertical shaft appears at 497.

The blade 482 is driven in rotation by a pulley 484 on the upper end of the first vertical shaft, that is in turn driven by a "V" belt 486 from a second pulley 488 fixed on a second vertical rotary shaft 490. A right angle drive connects the vertical shaft for being driven in rotation, by a first bevel gear 498 on the shaft 490 and a second bevel gear 500 on a horizontal shaft 502 held in a bearing sleeve 504 by a clamp 506. Bracket 494 and channel 492 are supports.

On the rearward end of horizontal shaft 502 is a second drive member or transverse pin 508 that when oriented fits into the slot that was described in reference to FIG. 2 at 46 when the shaft rearward end is in the bore of the first drive member; the bore was described at 48 in FIG. 2.

To assure alignment and to maintain assembly of these drive elements and of the unit 400 to the basic snowblower unit 12 the frame 496 has several features.

First, the frame 496 is rectangular like the shroud 20, preferably is formed of a plate 510, to the edges of which angles 512 are contiguously attached, with an arm 512′ of each angle extending rearwardly, all the angles together forming a recess into which the forward end of the shroud 20 fits snugly. To maintain the assembly, top arm 512″ has a pair of holes 514, 516 that receive the respective studs 70, 72 protruding upwardly from the top of the shroud 20.

Second, at each side of the frame 496 a laterally projecting ear 518 with hole 520 holds the threaded shank of a "J"-bolt 522, the hook-end 524 of which can be inserted into a respective one of the apertures 74 shown in the shroud 20 and drawn tight by a wing nut 526. This completes the simple two-step assembly, summarized by: (a) hook the frame 496 over the shroud studs 70, 72 and (b) engage and tighten the "J"-bolts 522.

It will be appreciated that the studs (or a stud) could be fixed on the frame pointing down and the shroud could have a hole or holes for the studs, without departing from the spirit of the invention.

In operation, the basic snowblower unit draws in the grass clippings through rear slot 528 in the housing and frame, and discharges them through the short stack 56. Preferably the short stack, which is made sturdy for the purpose, supports a rearwardly extending cantilevered duct 530 that in turn supports a screen 532 with a rim 534 from which a leaf-catching bag 536 hangs detachably attached by an elastic band 538 or a tie.

The easily stored and economical lawnmower unit may have housing braces 540, if desired, welded in place and to the plate 510 is desired. It is light in weight and can be hung up out of the way in the family garage or stood on end, when not in use. The belting may have any suitable lightweight shield over it, not shown.

Figure 5:
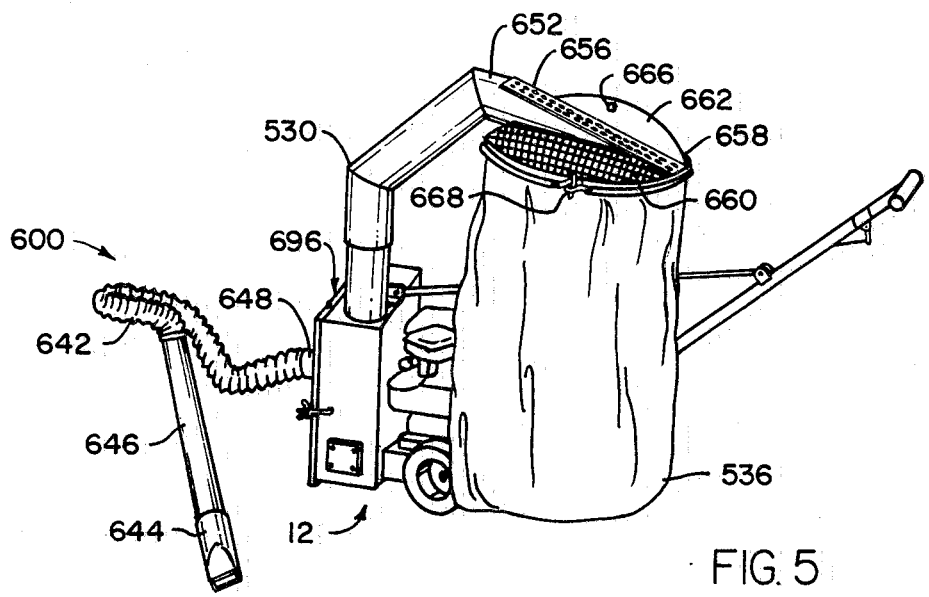
FIG. 5 is a rear perspective view of a vacuum and bagger unit in combination with the snowblower basic unit.
Figure 6:
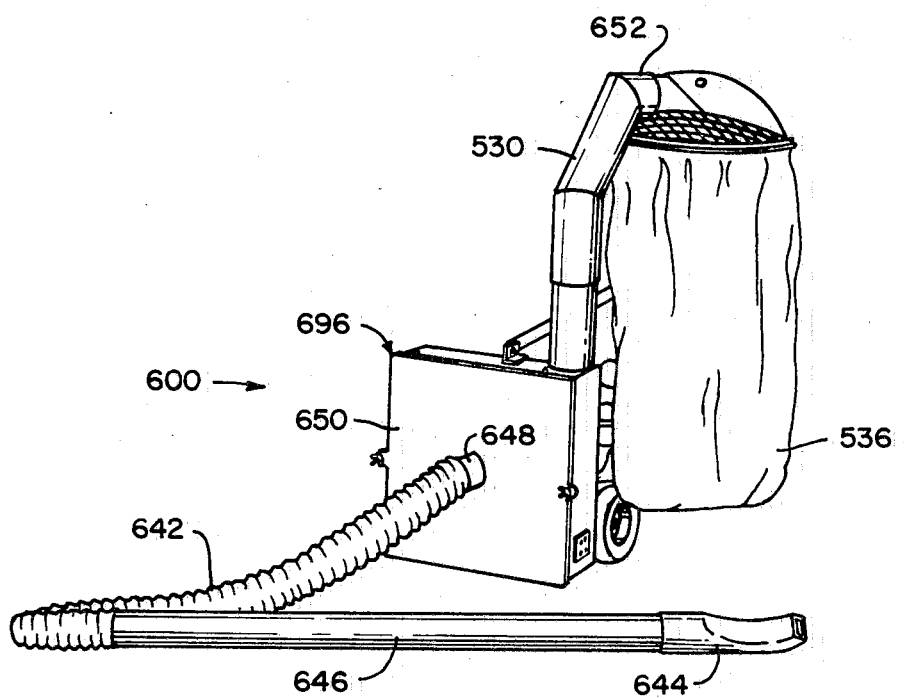
FIG. 6 is a front perspective view thereof.

FIGS. 5 and 6 show a further means for performing additional functions, attached to the snowblower basic unit 12, a vacuum and bagger unit 600 connected to the snowblower basic unit in similar manner to the lawnmower unit just described.

The flexible vacuum-hose 642 may conventionally have a rigid pickup nozzle 644 and tube 646 on one end. It is attached at the other end to the center of a frame 696 by means of a stub tube 648 passing through a hole in the plate 650 of the frame. The frame otherwise seals-off the forward face of the basic snowblower unit. Bagger provisions are the same as described relative to the lawnmower unit, with more detail shown here.

Because common plastic garbage bags are inexpensive they are preferred for leaf collection and disposasl, but they are impervious. It is most efficient to separate the leaves from the air near the top of the collection bag 536.

For this purpose, the following details are preferred. The terminal portion 652 of the duct 530 or bag overhanging end, has an open bottom facing down into the bag, and a relatively fine screen 656 along the top for air spillage, cresting turbulence to drip entrained leaves and the like. At least one-half of the circular, screened bag-holding member 658 supported by the portion 656 has relatively coarse screen 660 over it. The other half may be a door 662, hinged conventionally to open for access to the interior of the bag 536 and with a knob handle 666. A preferred form of hook-equipped elastic bag holder appears at 668.

Figure 7:
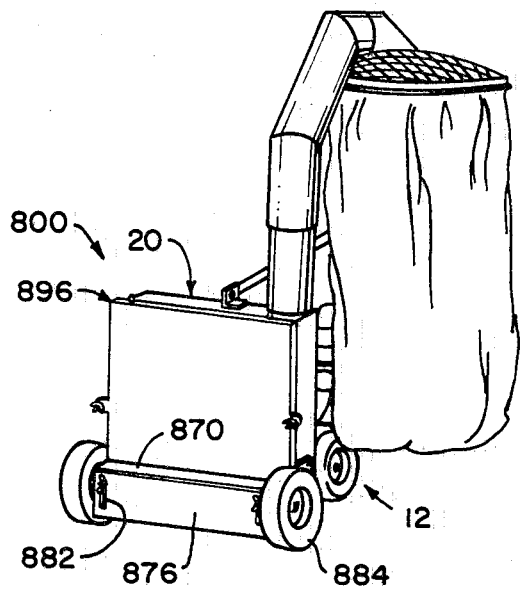
FIG. 7 is a front perspective view of a leaf picker unit in combination with the snowblower basic unit.
Figure 8:
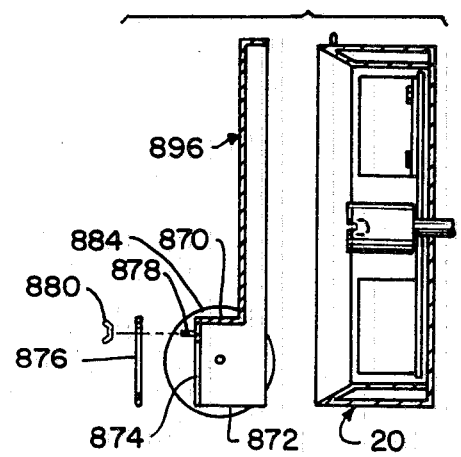
FIG. 8 is an exploded elevational diagram thereof in partial section.

FIGS. 7 and 8 show a unit 800 for clean pickup of debris from a surface. The frame 896 attaches and fits as before to shroud 20 except that the lower portion has a forwardly extending step 870 open at the bottom 872, and at the front 874, which is covered by a door 876. The door is vertically slidable for size-adjustment of the forward opening and mounts on a threaded stud 878 at each side, held by a wingnut 880 pressing it at the slots 882 against the sides of the stepped portion 870.

A pair of wheels 884 mounted to the stepped portion maintains angle of the two units in operation relative to the surface travelled. The shielding and open bottom connection to the shroud make this model extra efficient at ingesting and bagging leaves and other debris along the ground level.

Figures 9, 10:
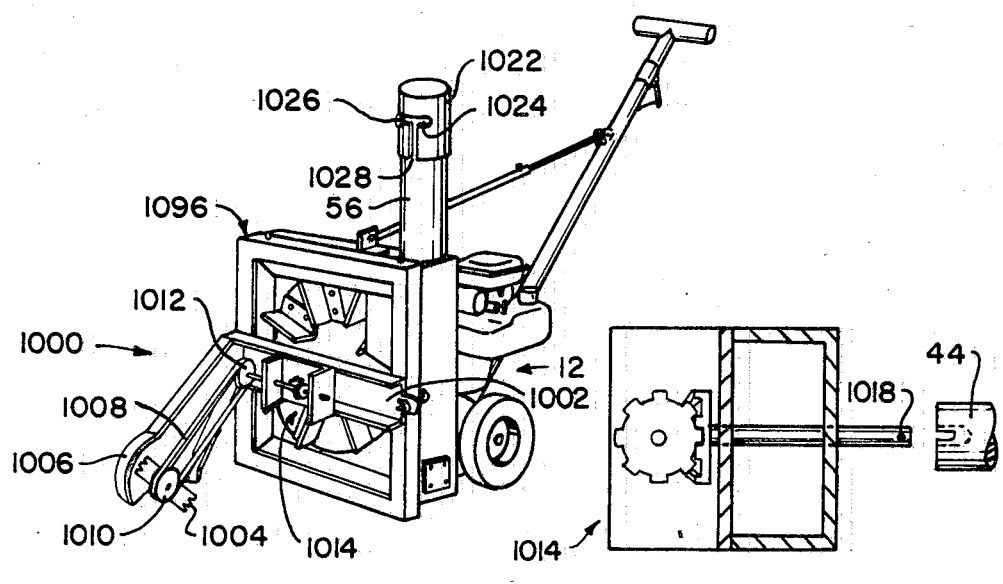
FIG. 9 is a front perspective view of an edger unit in combination with the snowblower basic unit.
FIG. 10 is a sectional detail thereof.

FIGS. 9 and 10 show details of an edger unit 1000 attachable to the snowblower basic unit in the way before described. The frame 1096 may be open with a transverse channel 1002 horizontally extending across it to support an edger blade 1004 by means of an arm 1006. Belt 1008 and pulleys 1010, 1012 driven through a conventional bevel gear right angle drive 1014 as before described, and first and second drive means 44 and 1018, also as described earlier power the edger unit 1000, which safely and visibly mounts to one side of the assembly.

On the short stack 56 a closure cap 1022 may be mounted to assure that dust and debris are blown forwardly by the fan, away from the user. To hold the cap in place, it may have a horizontal slot 1024 engaged by a screw 1026 on the short stack. The slot may join a vertical slot portion 1028 down through the edge, so that the cap can be twisted and lifted off.

Figure 11:
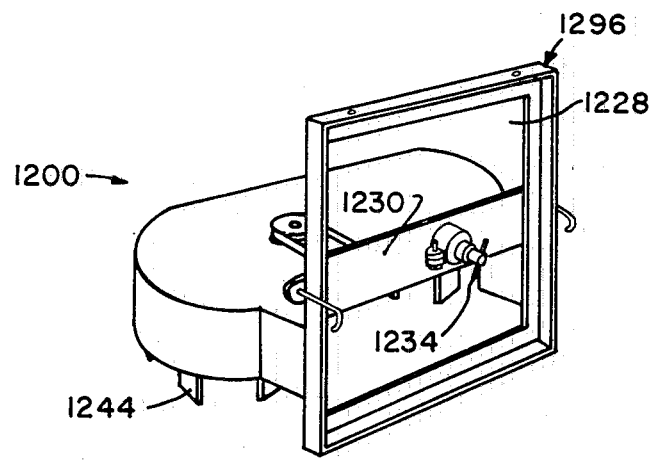
FIG. 11 is a rear perspective detail of a rotary tiller unit for use with the snowblower basic unit.
Figure 12:
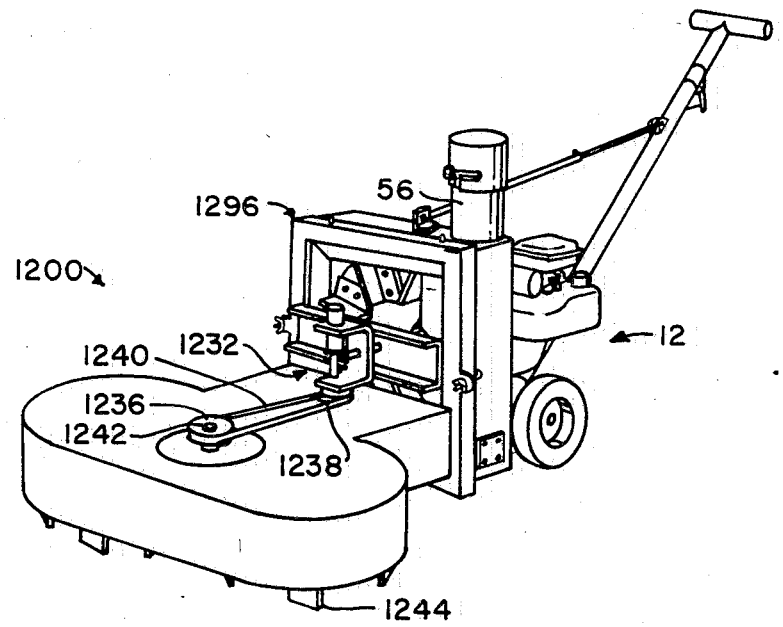
FIG. 12 is a front perspective view therof.

FIGS. 11 and 12 show a rotary tiller unit 1200 assembled, by an arrangement as described before, to the snowblower basic unit 12 by frame portion 1296. The frame portion may have an open front 1228 with transverse channel 1230 supporting a right-angle bevel gear drive 1232 like those described earlier, through first and second drive means also as described, the second drive means shown here at 1234. Pulleys 1236, 1238 and "V"-belt 1240 may drive the rotary tiller vertical input shaft 1242. The downward pointing blades 1244 of the tiller are conventionally held on two secondary vertical shafts driven by the input shaft by gears or belts. This rotary tiller is conventional. As one example of the relation of the parts, U.S. Pat. No. 2,888,084 to F. J. Trecker on 5-26-59 may be referred to for typical details of the blade mounting and drive, although the present invention provides more rugged equipment than this.

The short stack 56 is capped, so that dust and debris will be blown forwardly.

Figure 13:
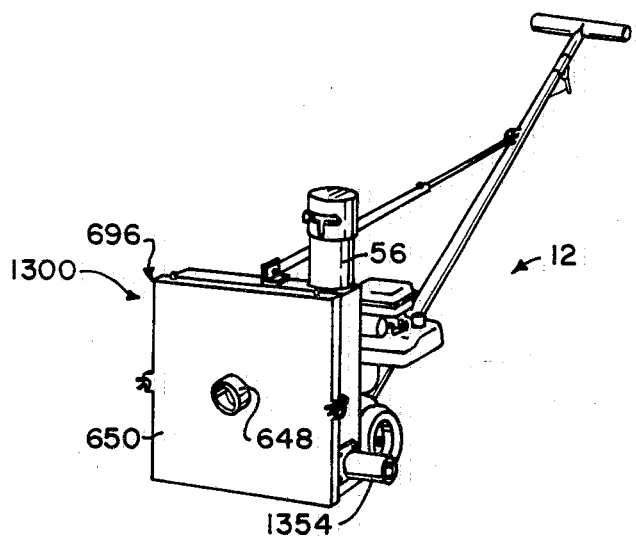
FIG. 13 is a front perspective view of a leaf blower unit in combination with the snowblower basic unit.

FIG. 13 shows a leaf blower unit 1300 assembled to the basic snowblower unit 12. Short stack 56 is capped, the frame 696 has a closure plate 650, central tube-opening 648 in the front, and the closure plate (described at 60 in FIG. 1) has been replaced by a laterally pointing stub tube 1354 similarly connected by bolts to the shroud at an opening through the shroud, low on the side under the short stack 56.

This assembly provides a highly directional and powerful air stream for precision leaf and debris clearing and windrowing, with nozzle.

Figure 14:
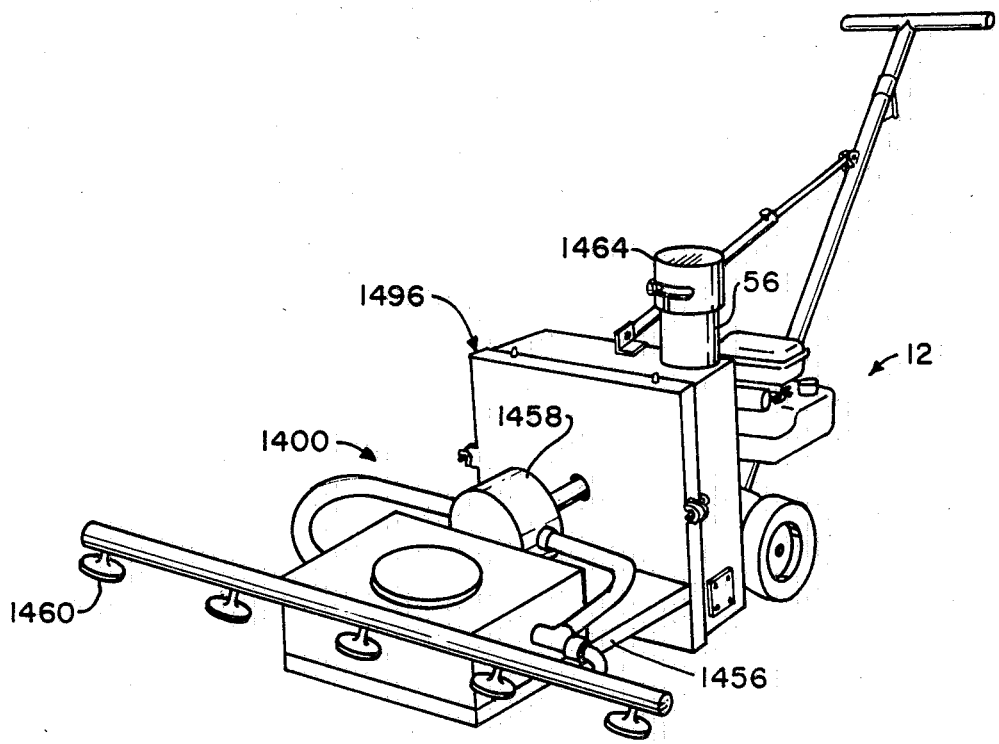
FIG. 14 is a front perspective view of a sprayer unit in combination with the snowblower basic unit.

FIG. 14 shows a sprayer unit 1400 assembled as before described to the basic snowblower unit 12. Frame 1496 includes a horizontal platform 1456 on which a sprayer pump 1458 mounts with the rest of the unit, with the nozzles 1460 well up front. The first and second drive means connect the units, as described before. Bolts may hold the unit to the platform. Short stack 56 is capped and the frame 1496 covers the shroud in front, so that there is effectively no blowing of the material sprayed.

Sprayer system details are conventional.

FIG. 15 shows an electric generator unit 1600 assembled to the snowblower basic unit 12 as described before. Frame 1696 supports a horizontal platform 1666 holding the generator 1672. The short stack 56 may be capped or may be left open to create cooling airflow for the generator through the open front of the frame. Generator system details are conventional.

FIG. 16 shows that the generator 1672 is driven by the same typical first drive means 44 driving a second drive means 1676.

FIG. 17 shows a typical hydraulic pump unit 1700 with frame 1796 and platform 1774 supporting it. The assembly to unit 12 is as before described including first and second drive means. Again, the short stack 56 may be left uncapped to provide a cooling airflow past the pump into the open front of the frame, or it may have a cap, detachable as before.

Pump system details are conventional.

Figure 18:
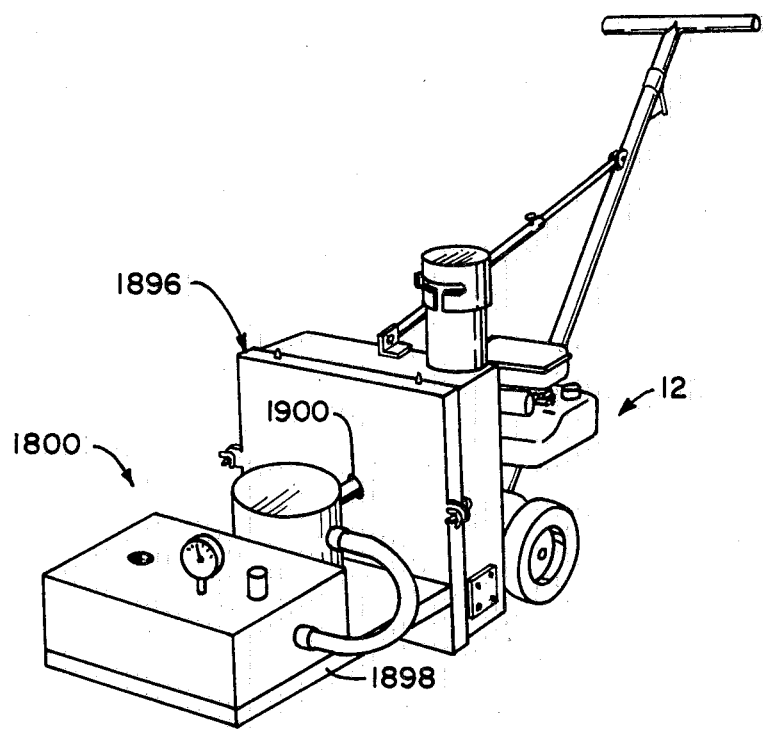
FIG. 18 is a front perspective view of an air compressor unit in combination with the basic snowblower unit.

FIG. 18 shows an air compressor unit 1800 with frame 1896, platform 1898 for support and with drive by unit 12 as described for similar units just described.

Compressor details are conventional.

The basic snowblower unit is, as indicated, a versatile all-year motorized unit, the fan feature being useful to vacuum and collect or not to collect, to blow, to support, and to cool, as desired, in addition to the almost automatic hookups to the various units powered by it. The cost of this system of units will be found to be only a fraction of the cost of individual units and the space required also only a fraction needed for storing separate units.

Power of the engine needed will depend on the user's intentions but a 3½ or 5 horsepower engine will probably serve the purposes of many non-commercial users, because of the efficiency of the power transmission. However, the basic principle can employ a higher-horsepower engine, such as a 10 horsepower engine, in a bigger machine, and can tow behind it a riding dolly hinged to the motor frame as by a removable pin.

To couple the basic snowblower unit to another unit, the user can roll it to the other unit, see that the first and second drive means are in the same orientation, raise the handle to lower the front of the basic snowblower unit, push it against the frame of the other unit, and lower the handle of the basic snowblower unit to hook the studs in the holes in the top of the frame of the other unit. The engine weight, handle weight and duct weight will either be sufficient to hold this relation while the "J"-bolts are tightened, or any suitable prop such as a small piece of wook shoved under the shroud will hold it during hanging, hooking and drawing together.

Front-heavy assemblies with the basic snowblower unit, such as the hydraulic pump unit and the compressor, that do not have wheels on them, will at the front rest against the ground or floor or other supporting surface and tend to remain where they are put. Vibration is not a problem with the basic snowblower unit because of the smoothness of the drive and the typical massive support in all directions of the frame grip on the shroud which itself is a rigid, strong member, well-braced.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. A system of wheeled vehicle comprising a basic snowblower unit with first wheels for engaging a supporting surface, with power source and with means for performing additional functions useful in domestic and commercial applications under power, comprising: the snowblower having a rectangular shroud with rear face, open forward face, top, bottom, left and right sides, a fan in the shroud, means for powering the fan including: first drive means having a shaft with an end extending from said power source into the shroud, means for powering the means for performing additional functions including: a first drive member on said end a frame, second drive means comprising a second drive member attached to the frame, means for holding the first and second drive means in operative alignment for supplying power to said means for performing additional functions; means for affixing to the shroud said means for performing additional functions, including: said frame proportioned for fitting against the shroud, and means for detachably affixing the frame on the shroud.

2. A system as recited in claim 1, said first wheels located behind the shroud in position for holding the bottom of the shroud adjacent a said supporting surface.

3. A system as recited in claim 2, said means for detachably holding the frame on the shroud including means for hanging the frame at the top of the shroud and means for drawing the frame and the shroud together.

4. A system as recited in claim 3, the means for hanging the frame including at least one projection for fitting in a hole, and the means for drawing the frame and the shroud together including a "J"-bolt at each side of the frame.

5. A system as recited in claim 2, the means for holding the first and second drive means in operative alignment including: structure defining a bore and transverse slot in one of said first and second drive members, and an end of a shaft fitting in said bore, a pin in the end of the shaft fitting in said transverse slot.

6. A system as recited in claim 2, a stack adjacent an end of the top of the shroud and communicating with the interior of the shroud for exhausting material therefrom.

7. A system as recited in claim 6, a stripper plate in the shroud for deflecting material upwardly into the stack.

8. A system as recited in claim 6, a duct supported by said shroud, means for adapting the duct for use with an imperforate bag including a first screen portion of the duct, a bag holder, means for engaging a bag with the bag holder, a second screen portion of the bag holder, and the first screen portion having finer mesh than the second screen portion.

9. A system as recited in claim 8, the bag holder having a door and a rim, means for engaging a bag with the rim, and the duct being the sole support for said bag holder and bag.

10. A system as recited in claim 2, said shroud having a forward portion sloped inwardly on each of said bottom, top and left and right sides.

11. A system as recited in claim 2, the frame closing off an upper portion of the shroud open forward face, and the means for performing additional functions comprising a rotary lawn mower with a wheel support extending ahead of the frame in position for discharging mowed material past a lower part of the frame into the shroud.

12. A system as recited in claim 11, the rotary lawnmower having a blade and a right angle connection at said second drive means, and a pulley and belt system for rotating the blade.

13. A system as recited in claim 6, the means for performing additional functions including a vacuum bagger adaptation comprising the frame having means for closing the open forward face of the shroud except for a central opening, and a vacuum hose with connection at the central opening.

14. A system as recited in claim 6, the means for performing additional functions including a vacuum sweeper provision wherein the frame includes a plate and a forward step in a lower portion for sealing off the open forward face of the shroud but leaving an opening at the bottom thereof, and second wheels for support.

15. A system as recited in claim 6, the means for performing additional functions including a leaf blower provision wherein the frame closes off the open forward face of the shroud except for a central opening, a closure closes the stack, and the structure at a lower part of one of said sides defines a leaf blower opening.

16. A system as recited in claim 15, and a tubular nozzle at said leaf blower opening.

17. A system as recited in claim 2, wherein the means for performing additional functions comprises a rotary tiller positioned as a forward extension from the frame.

18. A system as recited in claim 2, the means for performing additional functions comprising an edger extending forwardly from a side of the frame.

19. A system as recited in claim 2, wherein a platform extends forwardly from the frame, and the means for performing additional functions comprises a sprayer system on the platform.

20. A system as recited in claim 2, wherein a platform extends forwardly from the frame and the means for performing additional functions comprises a generator system on said platform in position for cooling by said fan.

21. A system as recited in claim 2, wherein a platform extends forwardly from said frame, and the means for performing additional functions comprises a hydraulic pump system on said platform.

22. A system as recited in claim 2, wherein a platform extends forwardly from said frame, and the means for performing additional functions comprises an air compressor system on said platform in position for cooling by said fan.

23. A system as recited in claim 2, said fan comprising a disk with a radial array of lengths of angle affixed thereto.

* * * * *